(12) United States Patent
Schwade et al.

(10) Patent No.: US 11,481,558 B2
(45) Date of Patent: Oct. 25, 2022

(54) SYSTEM AND METHOD FOR A SCENE BUILDER

(71) Applicant: Samsung Electronics Co., Ltd., Suwon-si (KR)

(72) Inventors: Allan J. Schwade, Santa Cruz, CA (US); Anil Yadav, Cupertino, CA (US); Melvin Lobo, Fremont, CA (US)

(73) Assignee: Samsung Electroncis Co., Ltd., Suwon-Si (KR)

( * ) Notice: Subject to any disclaimer, the term of this patent is extended or adjusted under 35 U.S.C. 154(b) by 185 days.

(21) Appl. No.: 16/566,459

(22) Filed: Sep. 10, 2019

(65) Prior Publication Data

US 2020/0081981 A1 Mar. 12, 2020

Related U.S. Application Data

(60) Provisional application No. 62/730,487, filed on Sep. 12, 2018.

(51) Int. Cl.
*G06F 40/30* (2020.01)
*G06N 20/00* (2019.01)
*G06F 40/284* (2020.01)

(52) U.S. Cl.
CPC ............ *G06F 40/30* (2020.01); *G06F 40/284* (2020.01); *G06N 20/00* (2019.01)

(58) Field of Classification Search
None
See application file for complete search history.

(56) References Cited

U.S. PATENT DOCUMENTS

| | | |
|---|---|---|
| 6,499,013 B1 | 12/2002 | Weber |
| 7,496,500 B2 | 2/2009 | Reed et al. |
| 7,657,519 B2 | 2/2010 | Anderson et al. |
| 2015/0255064 A1 | 9/2015 | Fujii et al. |
| 2016/0125048 A1 | 5/2016 | Hamada |
| 2018/0012110 A1 | 1/2018 | Souche et al. |
| 2018/0137855 A1 | 5/2018 | Lee et al. |
| 2018/0246877 A1 | 8/2018 | Vainas et al. |

FOREIGN PATENT DOCUMENTS

| | | |
|---|---|---|
| JP | 2000-293685 A | 10/2000 |
| KR | 10-1624184 B1 | 10/2000 |
| KR | 10-2018-0055189 A | 5/2018 |

OTHER PUBLICATIONS

ISA/KR, International Search Report and Written Opinion of the International Searching Authority, International Application No. PCT/KR2019/011818, dated Dec. 20, 2019, 8 pages.

*Primary Examiner* — Quynh H Nguyen

(57) ABSTRACT

A system and method for creating organized intent clusters or scenes using machine learning algorithms is provided. A method of creating organized intent clusters or scenes comprises extracting intent features related to the plurality of request inputs. The method also includes creating a plurality of groups comprising the extracted intent features. The method includes identifying a cluster based on co-occurring extracted intent features, the co-occurring extracted intent features belonging to a plurality of domains. The method further includes generating a proto-scene based in part by ranking the extracted intent features within the cluster.

21 Claims, 9 Drawing Sheets

SYSTEM AND METHOD FOR A SCENE BUILDER

CROSS-REFERENCE TO RELATED APPLICATION AND PRIORITY CLAIM

This application claims priority under 35 U.S.C. § 119(e) to U.S. Provisional Patent Application No. 62/730,487 filed on Sep. 12, 2018. This provisional application is hereby incorporated by reference in its entirety.

TECHNICAL FIELD

This disclosure relates generally to a computing system and method, and more particularly to a machine learning based approach for generating organized intent clusters or scenes.

BACKGROUND

Modern semantics is based on the idea that meaning in natural language is compositional—it arises from the words in an utterance and their relation to each other. The Natural Language Processing community has made various attempts to have machines understand the meaning of natural language. One of the more successful attempts is FrameNet. In FrameNet, schemas are created around verbs and any other words that are essential to understanding that verb. The major disadvantage of FrameNet is that specialists manually to perform a manual construction, which is incredibly costly and not saleable. Because it is already difficult to create accurate and affordable systems that understanding the literal meaning of words, tools that understand more abstract levels of representation like scenes or common narratives are rare.

SUMMARY

This disclosure provides a system and method for generating organized intent clusters or scenes utilizing modern machine learning algorithms and Natural Language Programing (NLP) and Natural Language Understanding (NLU) solutions.

In a first embodiment, a method of operation of a computing system comprises receiving a plurality of request inputs. The method includes extracting intent features related to the plurality of request inputs. The method also includes creating a plurality of groups comprising the extracted intent features. The method includes identifying a cluster based on co-occurring extracted intent features, the co-occurring extracted intent features belonging to a plurality of domains. The method further includes generating a proto-scene based in part by ranking the extracted intent features within the cluster.

In a second embodiment, a computing system includes an input interface configured to receive a plurality of request inputs. The computing system includes at least one processor coupled to the input interface. The computing system further includes a memory, coupled to the processor. The memory includes instructions executable by the at least one processor to extract intent features related to the plurality of request inputs; create a plurality of groups comprising the extracted intent features; identify a cluster based on co-occurring extracted intent features from the plurality of groups, the co-occurring extracted intent features belonging to a plurality of domains; and generate a proto-scene by ranking the extracted intent features within the cluster.

In a third embodiment, a non-transitory computer readable medium configured to store a plurality of instructions is provided. The plurality of instructions, when executed by at least one processor, are configured to cause the at least one processor to extract intent features related to the plurality of request inputs; create a plurality of groups comprising the extracted intent features; identify a cluster based on co-occurring extracted intent features from the plurality of groups, the co-occurring extracted intent features belonging to a plurality of domains; and generate a proto-scene by ranking the extracted intent features within the cluster.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 12 discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

This disclosure generally provides a tool, Scene Builder, designed to create narrative schemas. According to embodiments of the present disclosure, these schemas are composed of clustered, machine-executable intents supported by Natural Language Understanding (NLU) systems. For example, machine-executable intents for NLU systems may be "open my calendar", "start an email to Bill", or "set an alarm for 5 pm". Such requests, along with any available device information, are used by the NLU system to interpret the user's intent. Overtime the system will accumulate a rich history of user requests. The User Request Histories (URHs) are the cornerstone of Scene Builder. According to embodiments, the URHs contain user requests with the device's state information at the time of request, the states traversed in fulfilling the request, and the state the request resolves at. The device states, or domains, reflects how the device is being used. For example, the device state reflects if the home screen is being viewed or if a browser application or other application, such as YOUTUBE, is being executed. User requests may be verbally or manually provided to the system. According to embodiments of the present disclosure, user requests are not limited to verbal or manual input but comprise any input the system is configured to receive as part of data collection processes. Additional information may be utilized in scene generation when available. This includes location of execution, connected devices, user attributes, and more. Over time, Scene Builder generates a database of scenes that reflect various activities common to users when interacting with an electronic device that span device states or domains.

According to embodiments of this disclosure, an example of a scene would be constructed based on activities involved in going to the movies. For example, a user may first search the web for local theaters and the theater movie listings. The user may then watch some trailers for a couple of movies. The user may buy tickets using a website or a mobile application. The user might then ask for directions to the movie theater. Once at the theater the user will turn his or her phone to silent. These activities would be grouped together to create a scene "going to the movies" that would automatically guide a user through the process of searching for and ultimately going to a movie.

Figure 1:
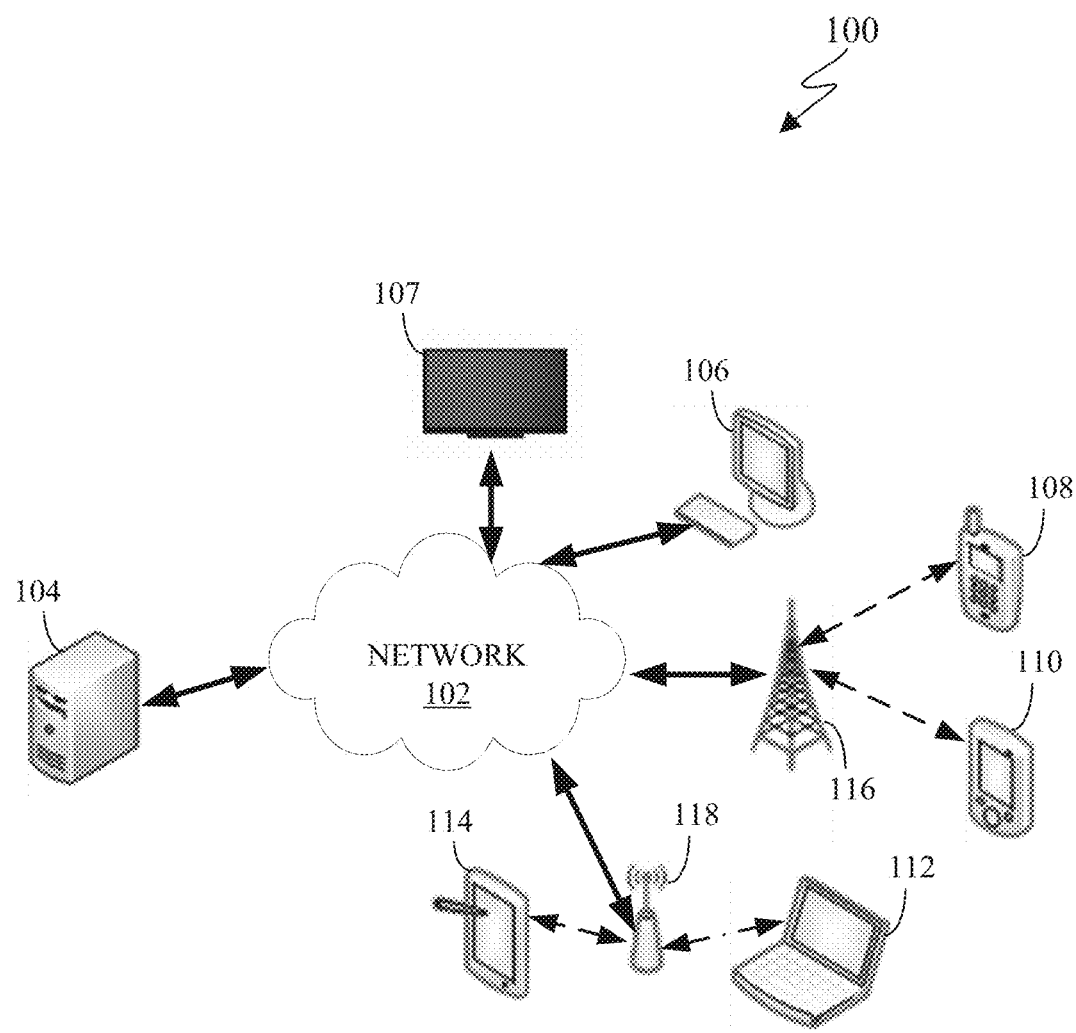
FIG. 1 illustrates an example communication system according to an embodiment of this disclosure.

FIG. 1 illustrates an example communication system 100 in accordance with embodiments of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a television (TV), a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each client device 106-114 represents any suitable computing or processing device that interacts with at least one server (such as the server 104) or other computing device(s) over the network 102. In this example, the client devices 106-114 include a desktop computer 106, a TV 107, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, TV 107, mobile device 108, PDA 110, laptop computer 112, or tablet computer 114) can include a user interface engine that modifies one or more user interface buttons displayed to a user on a touchscreen.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
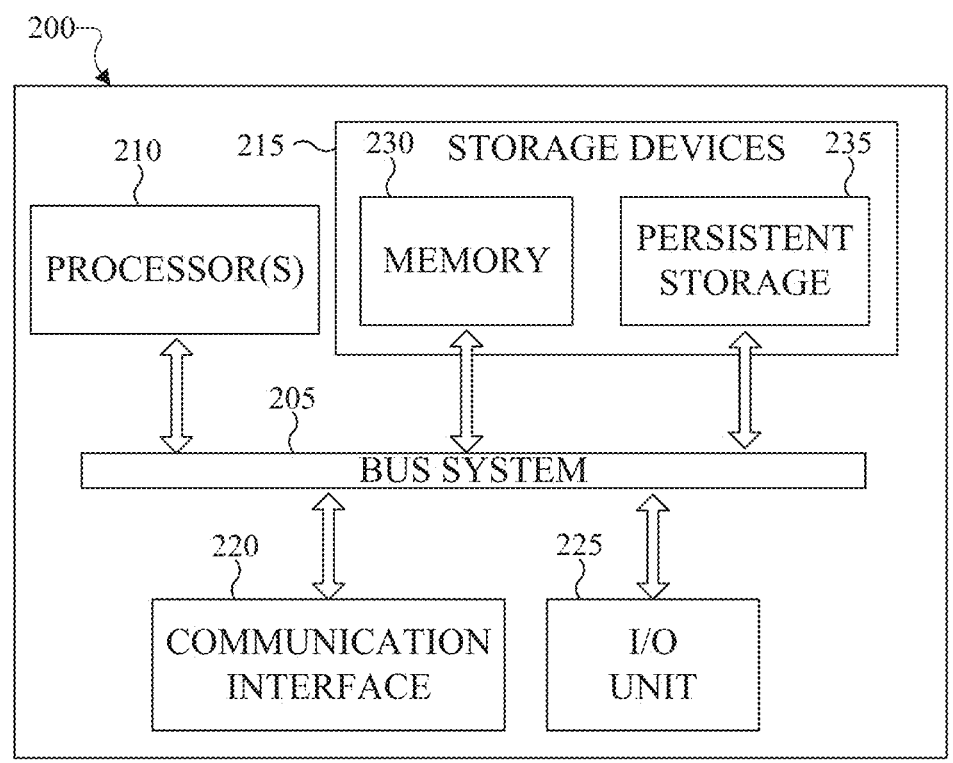
FIG. 2 illustrates an example server according to an embodiment of this disclosure.
Figure 3:
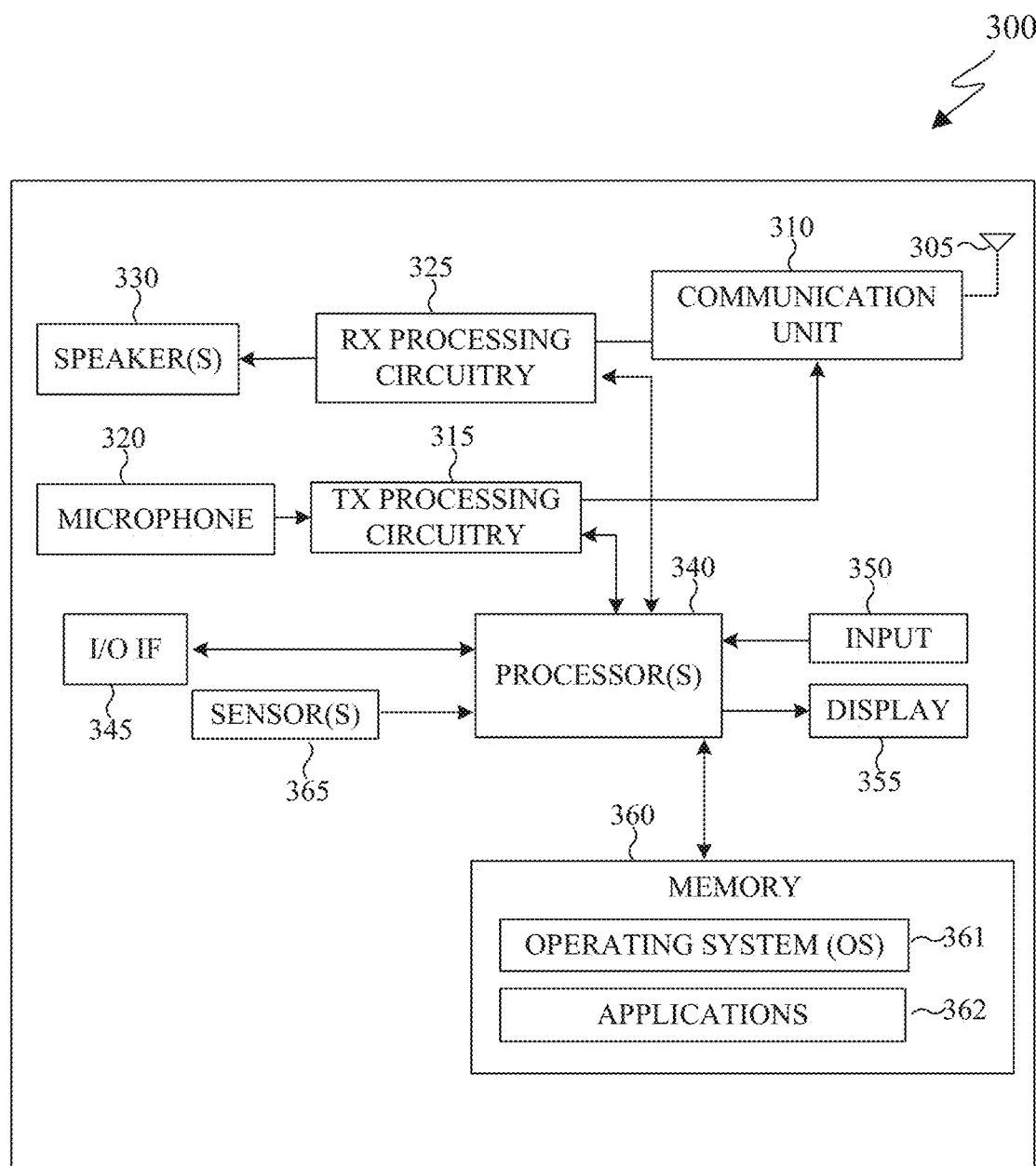
FIG. 3 illustrates an example electronic device according to an embodiment of this disclosure.

FIGS. 2 and 3 illustrate example devices in a communication system, such as the communication system 100 in FIG. 1, in accordance with embodiments of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, a neural network, and the like. The server 200 can be accessed by one or more of the client devices 106-114.

As shown in FIG. 2, the server 200 includes a bus system 205 that supports communication between at least one processing device 210, at least one storage device 215, at least one communications interface 220, and at least one input/output (I/O) unit 225.

The processing device 210, such as a processor, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a RAM or any other suitable volatile or non-volatile storage device(s). The persistent storage 235 can contain one or more components or devices supporting longer-term storage of data, such as a hard drive, ROM, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. In some embodiments, the electronic device 300 is useable with data transfer applications, such providing and receiving information from a server. The electronic device can be a TV (such as SAMSUNG SMART TV®). The electronic device 300 can be a digital video disc (DVD) player, a TV box (such SAMSUNG HOMESYNC, APPLETV, or GOOGLE TV), a gaming console (such as an XBOX, PLAYSTATION, or NINTENDO), or any of the other types of electronic devices described above. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or Bluetooth device) or other device of the network 102 (such as a WI-FI, Bluetooth, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361, in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing an input into a neural network. The processor 340 can move data into or out of the memory 360 as required by an executing process. In some embodiments, the processor 340 is configured to execute a plurality of applications 362 based on the OS 361 or in response to signals received from external source(s) or an operator. Example applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing, thereby allowing a user to input a voice command. As another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. Input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for a touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of devices in a communication system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4A:
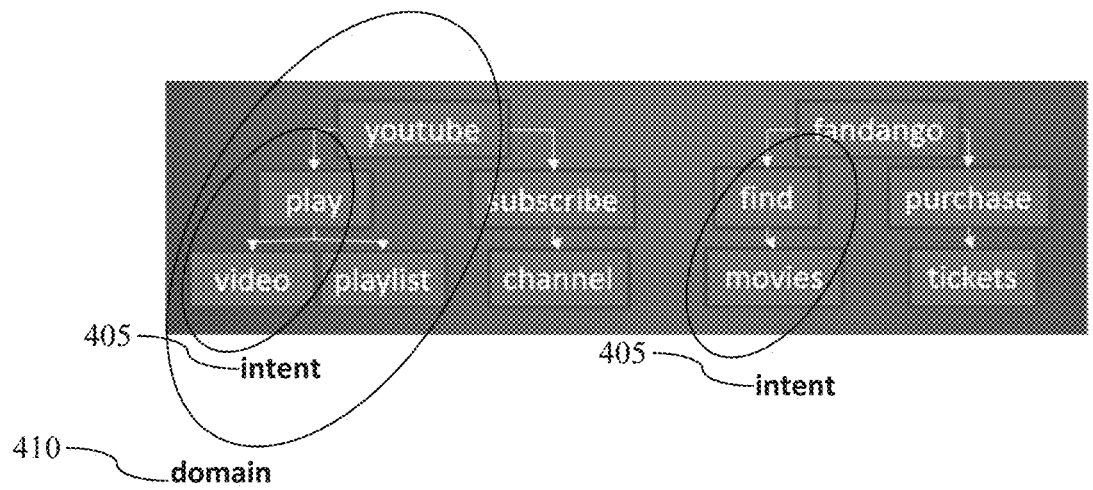
FIGS. 4A and 4B illustrate the ability of Scene Builder to go beyond user intents and reach across domains to create scenes, according to embodiments of this disclosure.
Figure 4B:
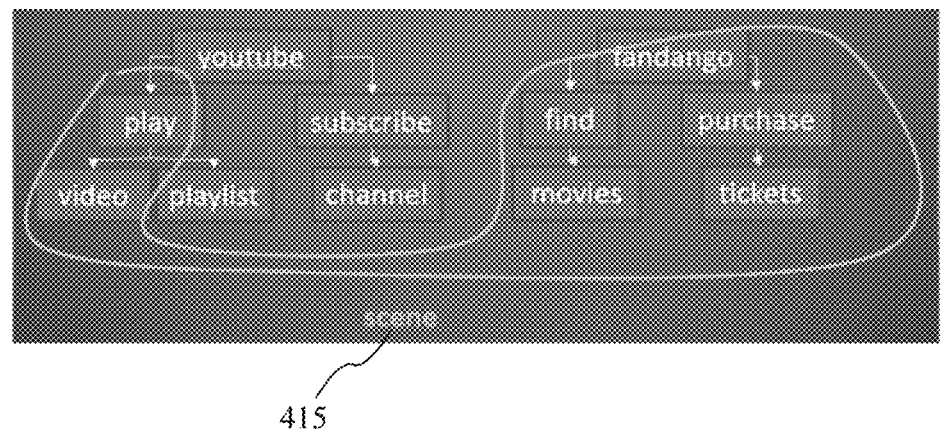

FIGS. 4A and 4B illustrate exemplary capabilities of Scene Builder to go beyond user intents and reach across domains to create scenes, according to embodiments of this disclosure. The embodiment of the Scene Builder as shown in FIGS. 4A and 4B are for illustration only and other embodiments could be used without departing from the scope of the present disclosure.

Referring to the non-limiting example of FIGS. 4A and 4B, Scene Builder is able to go beyond automatic speech recognition applications which execute commands based on how humans construct meaning using words. Scene Builder is able to focus on human culture and shared behaviors, i.e. the sociology, behind a combination of actions. For example, as illustrated in FIG. 4A, current technology can execute a command or request from a user to "play video." An electronic device can recognize the command to play the video as the intent 405. The electronic device would recognize the intent to play the video using the YOUTUBE™ application but also stay within the domain 410 of the application when determining follow-up actions associated with the request. Scene Builder is able to cross domains to engage various applications and functions of the electronic device associated with a scene 415 as illustrated in FIG. 4A. Scene Builder can associate a "play video" command from a user with an intent 405 to not only play a video using an application of the phone but also associate it with the intent 405 of find movies using another phone application, such as FANDANGO™. In this manner, Scene Builder learns human behavior associated with common interactions with the electronic device and creates scenes 415 encompassing intents 405 that stretch across domains 410.

Figure 5:
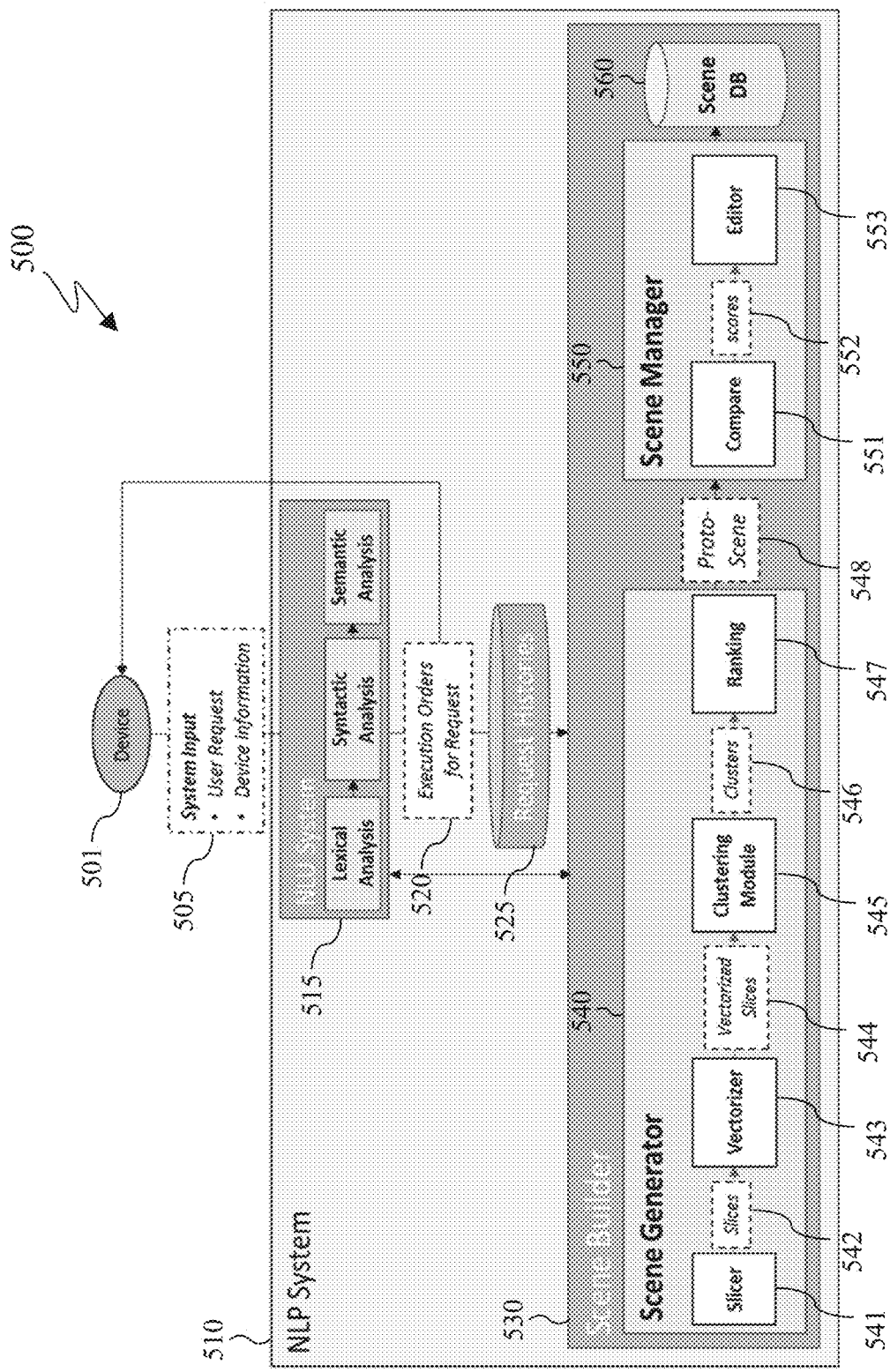
FIG. 5 illustrates an example architecture for generating scenes according to embodiments of this disclosure.

FIG. 5 illustrates an example architecture for generating scenes according to embodiments of this disclosure. The embodiment of the architecture for generating scenes as shown in FIG. 5 is for illustration only and other embodiments could be used without departing from the scope of the present disclosure.

Referring to the non-limiting example of FIG. 5, an electronic device 501, such as the electronic device 300 of FIG. 3, transmits system input 505, to a Natural Language Understanding (NLU) system 515. According to embodiments of this disclosure, the electronic device 501 is understood to be a mobile phone. System input 505 includes user requests as detected by the electronic device 501 and device information. An example of system input 505 would be a user speaking a command such as "search for movies playing nearby." System input 505 is not limited to verbal or manual language requests to the system. For example, a system can be configured to include any input detected by an electronic device, such as video input captured by a camera, that is related to scene generation. According to embodiments of this disclosure, the terms request and user request are used interchangeably when referring to commands received from the user by the electronic device 501 to enable scene generation.

Figure 6:
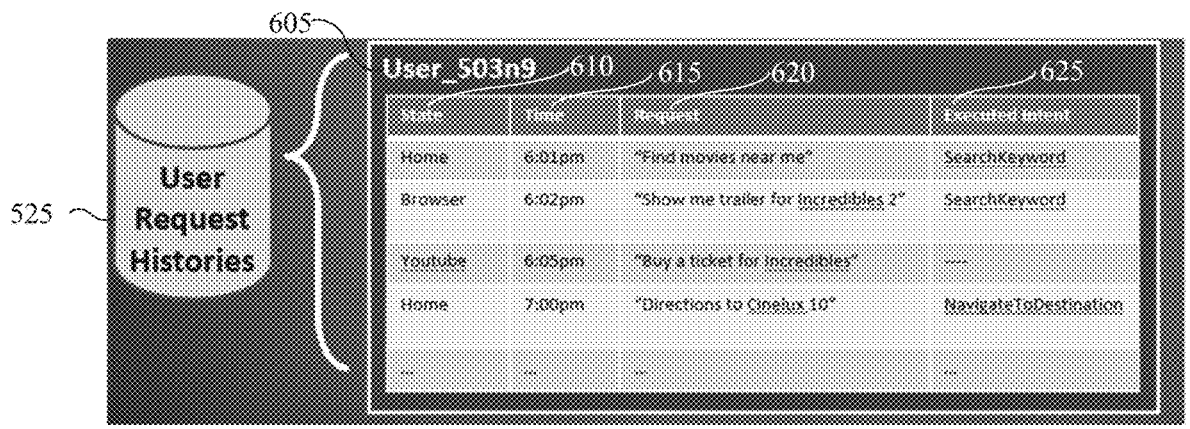
FIG. 6 illustrates example user information in a URH according to embodiments of this disclosure.

According to embodiments of this disclosure, the NLU system 515 processes the user request 505 to extract lexical, syntactic, and semantic features for the words and phrases in the request. The process is similar to common automatic speech recognition processes that analyzes user input to generate an execution order for a device. Lexical features include parts of speech, word shape, named entity information and more. Syntactic features extracted reflect dependency or constituency information. Semantic features include, but are not limited to, knowledge-graph/ontology relations. The NLU system 515 outputs execution orders 520 for the request and sends the extracted features to the server for use in the User Request Histories (URHs) database 525. The execution orders 520 are reflected in the URHs as 'Executed Intent.' (As illustrated in FIG. 6). The executed intent is the action taken by an electronic device in response to the user request 505 as a result of the NLU system 515 processes. The extracted feature of 'Executed Intent' is also referred to as a goal because the system is designed to execute the intent or has the goal of executing an application to execute the intent, of the user on the electronic device 501. The URHs 525 include the extracted features which reflect the 'Executed Intent' or goal from the user request as well as temporal and device state information associated with the feature. According to embodiments of this disclosure the URHs may contain various other pieces of information related to the user and device including but not limited to location FIG. 6 illustrates example extracted features in the URHs 525 according to embodiments of this disclosure. The embodiment of the extracted features in the URHs as shown in FIG. 6 is for illustration only and other embodiments could be used without departing from the scope of the present disclosure, Referring to the non-limiting example of FIG. 6, the extracted features 605 for User_503$n$9 reflects a State 610, a Time 615, a Request 620 and an Executed Intent 625. The State 610 or device state is the state of the electronic device 501 when the Request 620 is received. The Request 620 is the same as the user request 505 as illustrated in FIG. 5. For example, the verbally spoken command, or Request (user request) 620, of "Find movies near me" is input into the electronic device 501 when the electronic device 501 is on the home screen, State 610. The Executed Intent 625, or goal, is SearchKeyword which is executed by a Browser application as reflected in the change of device state 610 from home to browser.

According to embodiments of this disclosure, the Scene Builder 530 utilizes the data in the URHs 525 to generate and manage scenes. Referring again to the non-limiting example of FIG. 5, there are three major components to the Scene Builder 530: (i) the Scene Generator 540, (ii) the Scene Manager 550, and (iii) the Scene Database 560.

According to embodiments of this disclosure, the Scene Generator 540 creates a proto-scene 548 utilizing clustering algorithms. Examples of clustering algorithms include, but are not limited to K-means clustering, hierarchical agglomerative clustering (HAC), mean-shift clustering, Expectation-Maximization (EM) Clustering using Gaussian Mixture Models (GMM), or Density-based spatial clustering of applications with noise (DBSCAN). The Scene Generator 540, first slices, or divides up, the records in the URHs according to a slice threshold. Slice thresholds are parameters used to determine how to divide up the records in the URHs to achieve smaller groupings of data. For example, a record in the URHs can be sliced according to a time parameter, wherein the data is split into groups of 30 minute increments. Slice thresholds include, but are not limited to, a number of actions, time, a number of device state changes, location and intent.

Figure 7A:
FIGS. 7A and 7B illustrate slice thresholds as applied to URHs, according to embodiments of this disclosure.
Figure 7B:
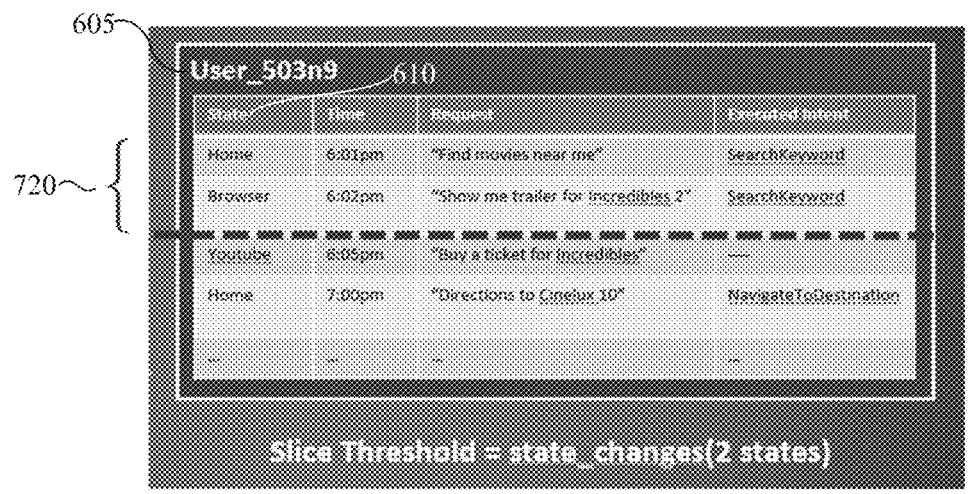

FIGS. 7A and 7B illustrate slice thresholds as applied to a URH, or extracted features 605 within the URHs database 525, according to embodiments of this disclosure. The embodiments of the slicing process applied to extracted features 605 as shown in FIGS. 7A and 7B is for illustration purposes only and other embodiments could be used without departing from the scope of the present disclosure.

Referring to the non-limiting example of FIG. 7A a slice threshold is based on Time 615. The slice threshold of 30 minutes is applied to the extracted features 605. The first 3 entries are included in slice 710 based on this slice threshold of 30 minutes. Similarly, FIG. 7B illustrates that slice 720 only includes two entries from the extracted features 605 because the slice threshold is configured to reflect a State 610 change, namely, for example, every two states.

Figure 8A:
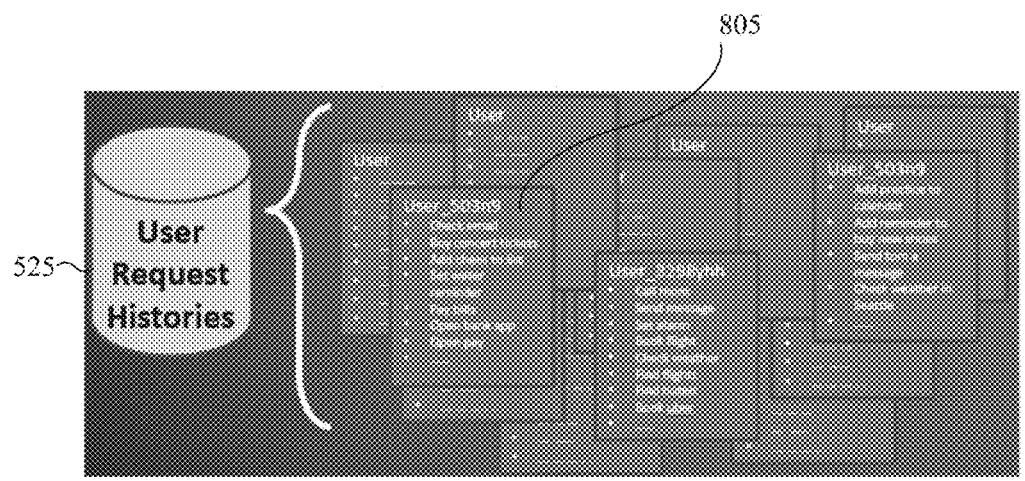
FIGS. 8A and 8B illustrate the URHs as a collection of user request information before and after slicing according to embodiments of this disclosure.
Figure 8B:
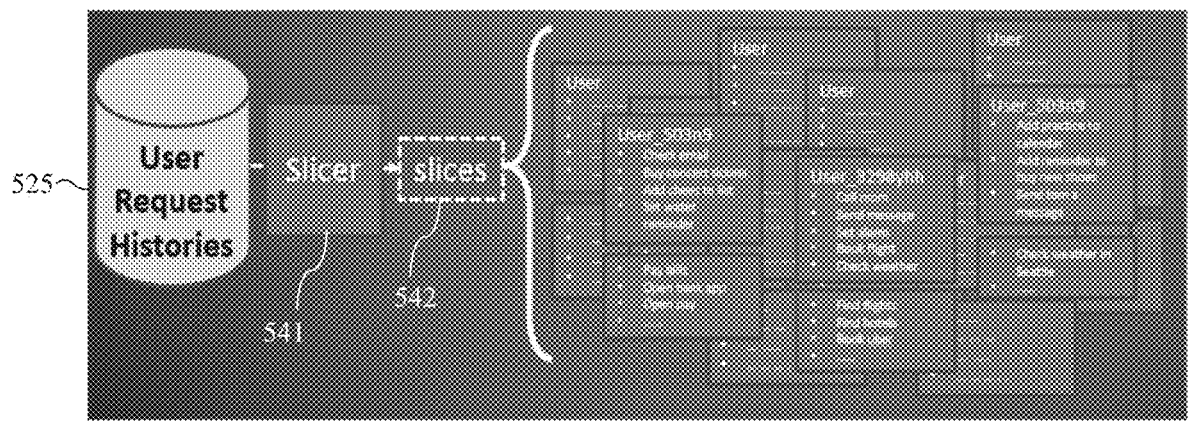

FIGS. 8A and 8B illustrate examples of the URHs as a collection of extracted intent features before and after slicing according to embodiments of this disclosure. The embodiments of the URHs as shown in FIGS. 8A and 8B are for illustration only and other embodiments could be used without departing from the scope of the present disclosure.

Referring to the non-limiting example of FIG. 8A, the URHs 525 are illustrated as being a collection of individual extracted features 805 or records, containing only the intent feature or goals resulting from a user request input 505. For example, User_503$n$9 contains the requests or intents: "Check email; Buy concert tickets; Add cheese to list; Set water reminder; Pay bills; Open bank app; Open pay." FIG. 8B illustrates an output from the Slicer 541 according to embodiments of this disclosure. The Slicer outputs a collection of individual extracted intent features 805 that are sliced (divided up) into smaller data sets, to enable a more accurate and robust comparison of the extracted intent features 805. According to embodiments of this disclosure, slicing is used to create meaningful vectors, since a user's request history will almost never be a complete scene by itself, but a series of scenes interspersed with isolated requests. If the slicer yields a series of intents that do not form a scene, it's expected that with sufficient data, these non-scene slices will amount to noise in the model and not form a meaningful cluster. Referring again to the non-limiting example of FIG. 5, once the URHs 525 are split up into slices or groups 542, each slice is processed by the Vectorizer 543 to convert the slice content into a readable format for the Clustering Module 545.

Figure 9:
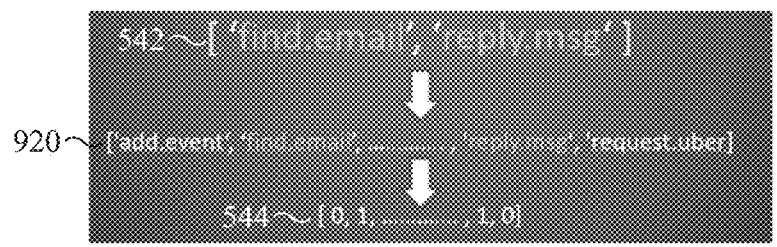
FIG. 9 illustrates an example of converting slices into bit-vectors, according to embodiments of this disclosure.

FIG. 9 illustrates an example of converting slices into bit-vectors, according to embodiments of this disclosure. The embodiment of the vectorizing process shown in FIG. 9 is for illustration only and other embodiments could be used without departing from the scope of the present disclosure.

Referring to the non-limiting example of FIG. 9, the slices 542 are turned into bit-vectors using a list, or vector, of all possible extracted intent features or goals 920 in the URHs 525. If a slice 542 contained a goal, it is presented as a '1' in the goal vector 544. If the goal was not in the slice 542, it is presented as a '0' in the goal vector 544. For example, 'find.email', and 'reply.msg' are in the example slice 542 and therefore, these events correspond to a 1 in the goal vector 544. The Vectorizer 543 outputs goal vectors, such as vector slices 544 that correspond to the plurality of slices 542.

Figure 10:
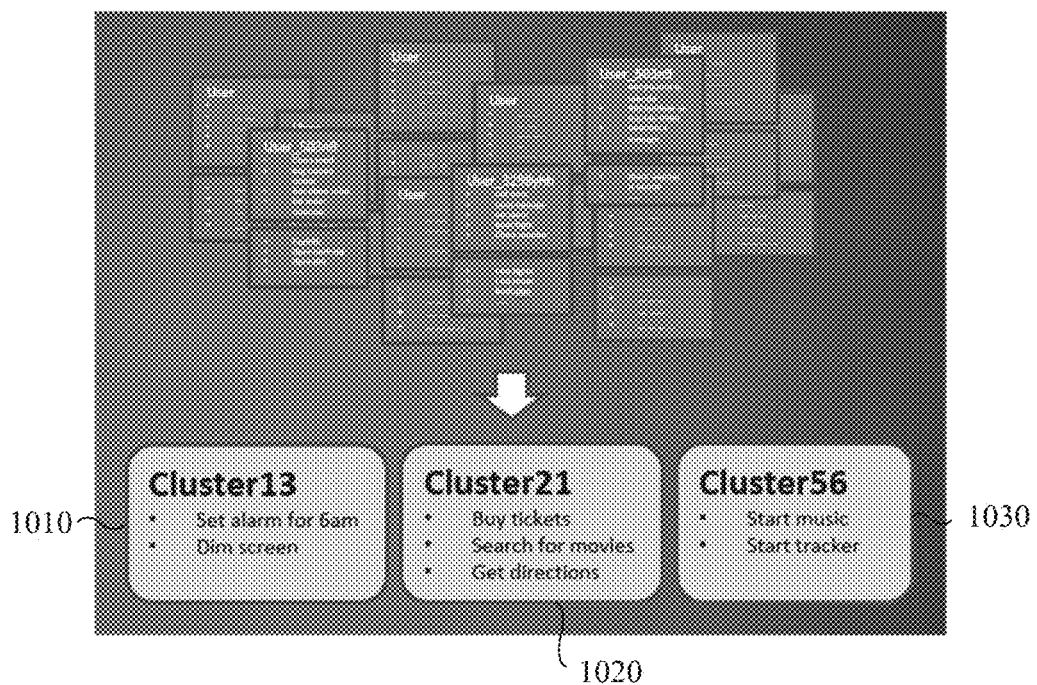
FIG. 10 illustrates examples of clusters resulting from a non-hierarchal clustering algorithm according to embodiments of this disclosure.

FIG. 10 illustrates examples of clusters 546 resulting from a non-hierarchal clustering algorithm according to embodiments of this disclosure. The embodiment of the non-hierarchal clustering algorithm used to create clusters shown in FIG. 10 is for illustration only and other embodiments could be used without departing from the scope of the present disclosure.

Referring to the non-limiting example of FIG. 10, also with reference to FIG. 5, the vector slices 544 that are output from the Vectorizer 543 are fed to a Clustering Module 545 and then a Ranking Module 547. First, the vector slices 544 are clustered using a non-hierarchical clustering algorithm in order to identify similar vector slices 544. The output of the Clustering Module 545 are clusters 546. The clustering algorithm compares the extracted intent features or goals contained in the vector slices 544 to identify similar co-occurring intents or goals. The clustering algorithm then creates clusters 546 to group co-occurring intents or goals that are related to each other. These clusters 546 contain intents or goals that reach across domains such that they relate to a common activity.

FIG. 10 illustrates three example clusters 1010, 1020, 1030 after processing the vectorized slices 544 by a non-hierarchical clustering algorithm according to embodiments of this disclosure. For example, 'Cluster13' 1020 contains intents or goals, 'Set alarm for 6 am' and 'Dim screen,' that relate to going to bed at night. 'Cluster21' 1020 contains intents or goals, 'Buy tickets', 'Search for movies', and 'Get directions', that are related to going to the movie theater. 'Cluster56' 1030 contains intents or goals 'Start music' and 'Start tracker', that are related to going for a run or a jog. The three clusters contain intents or goals that spread across domains. For example, 'Cluster21' 1020 contains goals related to going to the movies but the goal or intent of 'Buy tickets' is executed by a different application than the application which executes the goal or intent of 'Get Directions.'

Figure 11:
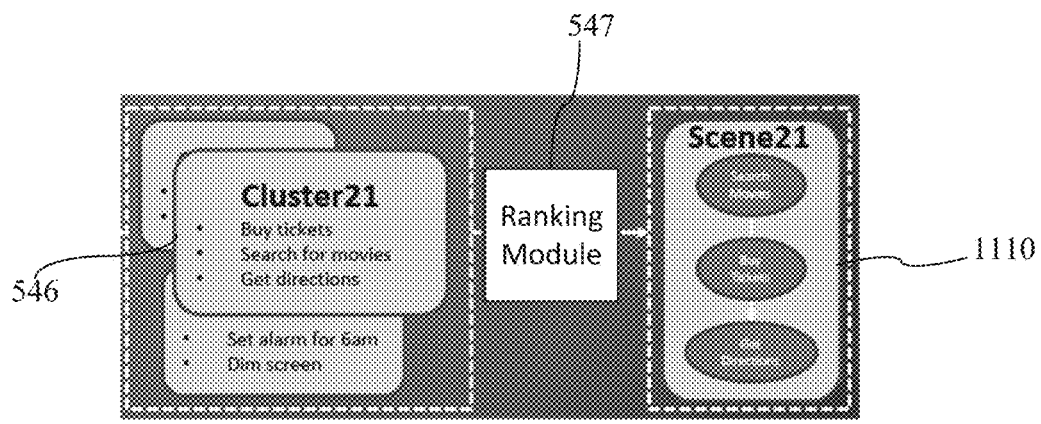
FIG. 11 illustrates the process of organizing the intents within the clusters using the Ranking Module, according to embodiments of this disclosure.

FIG. 11 illustrates the process of organizing the intents or goals within the clusters using a Ranking Module 547, according to embodiments of this disclosure. The embodiment of the Ranking Module to organize the intents or goals within the clusters shown in FIG. 11 is for illustration only and other embodiments could be used without departing from the scope of the present disclosure.

Referring to the non-limiting example of FIG. 11, also with reference to FIG. 5, the clusters 546 are fed into the Ranking Module 547. The Ranking Module 547 performs rank aggregation on clusters 546 that are similar to each other. According to embodiments, various distance measure may be used, such as Kendall Tau Distance or Spearman Footrule Distance, depending on the data set size, system capacity, and restrictions on time for analysis. The rank aggregation method will take the clusters 546 and return ordered sets of goals, where goals corresponds to a particular intent in the NLU system and the set of goals corresponds to an activity. These rankings are called proto-scenes 548. FIG. 11 illustrates an example proto-scene, 'Scene21' 1110 which corresponds to 'Cluster21.' The Ranking Module 547 took the three goals or intents from 'Cluster21' and ordered them to reflect the most logical order in which the goals would take place. As illustrated, 'Scene21' reflects that the goals that surround the activity of going to the movie would most likely be ordered such that the goal of 'Search Movies' would be followed by the goal of 'Buy Tickets' with the goal of 'Get Directions' being the last goal in the example proto-scene 1110.

Referring again to the non-limiting example of FIG. 5, proto-scenes 548, the output of the Scene Generator 540, are fed into the second component in Scene Builder 530, the Scene Manager 550, according to embodiments of this disclosure. The Scene Manager 550 compares each proto-scene 548 to approved scenes in the Scene Database 560.

According to embodiments of this disclosure, the Scene Manager 550 comprises a Compare Module 551 and an Editor 553. First, the Compare Module 551 compares the proto-scene 548 to the existing scenes in the Scene Database 560. The Compare Module 551 calculates a goal overlap score which is based on a number of goals that overlap between the proto-scene 548 and an existing scene. The Compare Module 551 also determines whether a proto-scene 548 is novel. Based on the goal overlap score or novelty assessment, the Scene Manager 550 determines if the proto-scene 548 should be added to the Scene Database 560, added to an existing scene or discarded. The Editor 553 will edit an existing scene if the Scene Manager 550 determines that at least one goal from the proto-scene 548 should be added to the existing scene.

According to embodiments of this disclosure, the final component of the Scene Builder 530 is the Scene Database 560. The Scene Database 560 stores approved scenes for use by other system components.

Figure 12:
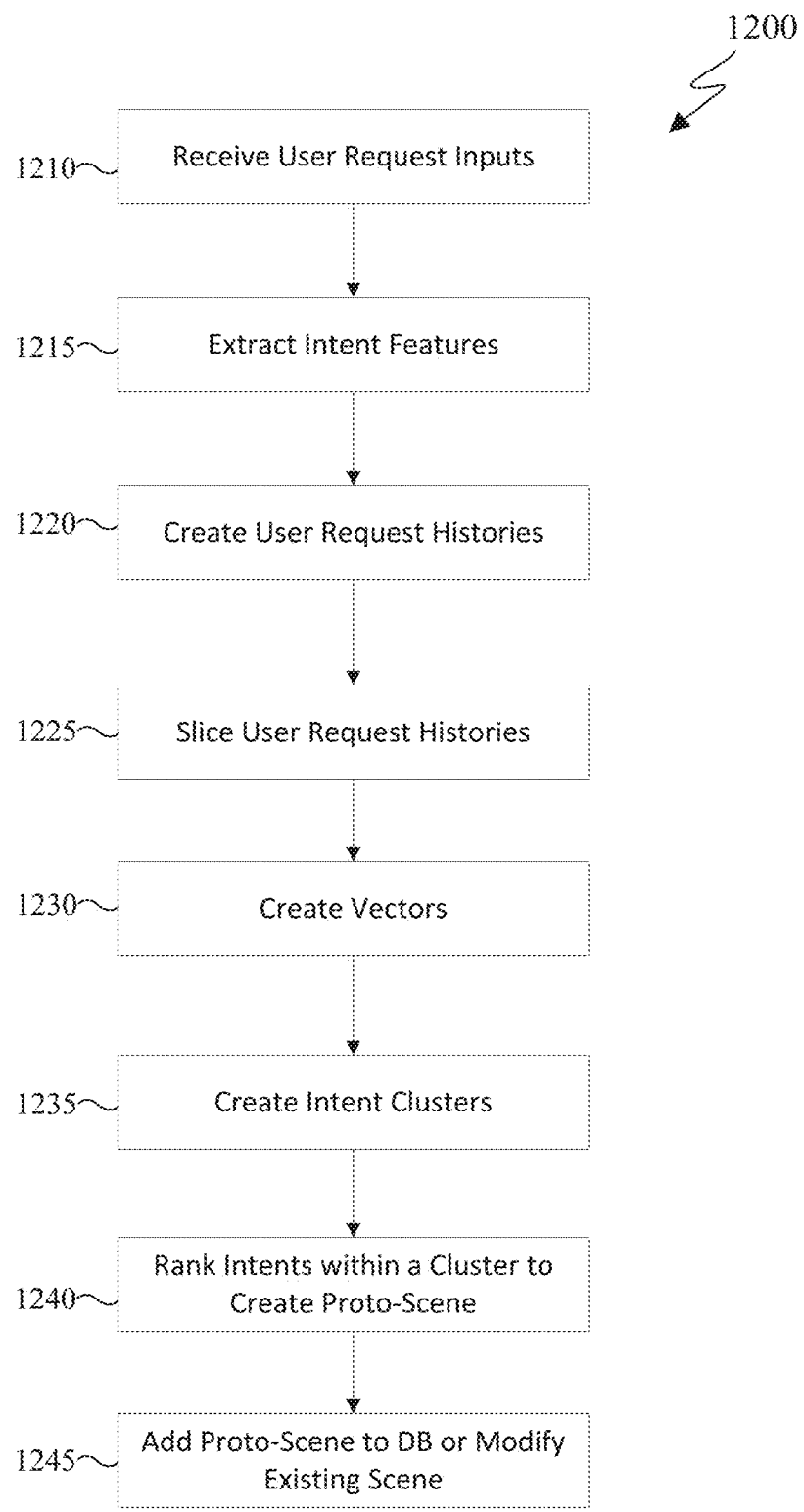
FIG. 12 is a block diagram that illustrates an example method of a machine learning algorithm to create and store proto-scenes comprising co-occurring user intents from across domains related to a user activity.

FIG. 12 is a block diagram that illustrates an example method 1200 of a machine learning algorithm to create and store proto-scenes comprising co-occurring user intents from across domains related to a user activity according to embodiments of this disclosure. The method 1200 may be performed by the server 104 or any of the client devices 106-114 of FIG. 1, the server 200 of FIG. 2, the electronic device 300 of FIG. 3, or any other suitable device or system. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 1210, the server 104 receives user request inputs from an electronic device 300. The user request inputs can be obtained by the electronic device through verbal, manual or other language commands received by the electronic device.

In block 1215, intent features are extracted using Natural Language Processing (NLP) or Natural Language Understanding (NLU) methods. The intent features are related to what is executed by the electronic device in response to the user request. The intent features reflect what is intended by the user when the request was made and how the electronic device executed the request. The intent features are also known as the goals.

In block 1220, User Request Histories (URHs) are created by the server 104. The URHs contain plurality of user information records that reflect information related to a user request and device information. For example, a URH contains information regarding device state, time, a user request and an executed intent of the user request according to embodiments of this disclosure.

In block 1225, the URHs are sliced, or divided-up, to create smaller groupings of data. The URHs are sliced according to predetermined slice thresholds, including but not limited to a number of actions, time, a number of device state changes, location and intent.

In block 1230, the slices of URHs are converted to vectors. The vectors correspond to the features of each slice. Features include but are not limited to goals, word embeddings, date and time information, geographical coordinates, and/or device information.

In block 1235, a non-hierarchal clustering algorithm as applied to the vectors creates intent clusters. The intent clusters reflect intents or goals from across domains that are related to an activity or scene.

In block 1240, a rank aggregation method is applied to each cluster. The ranking method will take each cluster and return it as an ordered set of intents or goals, called proto-scenes, where each proto-scene corresponds to an activity.

In block 1245, the proto-scene is compared to existing scenes in a scene database. The server determines if the proto-scene should be added to the database, discarded or if an existing scene should be modified. If the proto-scene is novel, the server will add the proto-scene to the scene database. If the server determines that an existing scene should be modified, the server will execute editing instructions to perform a modification of the existing scene to include at least one intent or goal from the proto-scene.

Although various features have been shown in the figures and described above, various changes may be made to the figures. For example, the size, shape, arrangement, and layout of components shown in FIGS. 1 through 12, are for illustration only. Each component could have any suitable size, shape, and dimensions, and multiple components could have any suitable arrangement and layout. Also, various components in FIGS. 1 through 12 could be combined, further subdivided, or omitted and additional components could be added according to particular needs. Further, each component in a device or system could be implemented using any suitable structure(s) for performing the described function(s). In addition, whiles FIG. 12 illustrates various series of steps, various steps in FIG. 12 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
    receiving, by an input interface of a Natural Language Processing (NLP) computing system, a plurality of request inputs;
    extracting, by the NLP computing system, intent features related to the plurality of request inputs by using natural language processing, each extracted intent feature comprising a goal resulting from a request input from among the plurality of request inputs;
    creating, by the NLP computing system, a plurality of groups comprising the extracted intent features by:
        slicing, by the NLP computing system, the extracted intent features into sliced content; and
        converting the sliced content into readable content for clustering;
    identifying, from the plurality of groups, a cluster based on co-occurring extracted intent features corresponding to a same user activity as each other, the co-occurring extracted intent features belonging to a plurality of domains;
    generating, by the NLP computing system, a proto-scene by ranking the extracted intent features within the cluster; and
    automatically guiding a user through a process using the proto-scene.

2. The method of claim 1, wherein creating the plurality of groups comprises:
    creating request histories, including a series of the extracted intent features, based on the plurality of request inputs; and
    slicing the request histories according to slice thresholds.

3. The method of claim 2, wherein the slice thresholds are based on at least one of a number of actions, a time duration, a number of device state changes, location information, or intent.

4. The method of claim 1, wherein the extracted intent features comprise at least one of a request, a time of the request, or a device state associated with the request.

5. The method of claim 1, wherein the ranking of the extracted intent features is accomplished by a rank aggregation method.

6. The method of claim 1, wherein the proto-scene includes a plurality of goals associated with the user activity, and wherein the ranking of the extracted intent features is into a logical order in which the goals would take place.

7. The method of claim 6, further comprising:
    comparing, by the NLP computing system, the proto-scene to existing scenes in a scene database according to a goal overlap threshold for scene management,
    wherein scene management comprises adding the proto-scene to the scene database, modifying an existing scene from the scene database to incorporate at least one goal from the proto-scene, or discarding the proto-scene.

8. A Natural Language Processing (NLP) computing system comprising:
    an input interface configured to receive a plurality of request inputs;
    at least one processor coupled to the input interface; and
    a memory coupled to the at least one processor, the memory including instructions executable by the at least one processor to:
        extract intent features related to the plurality of request inputs by using natural language processing, each extracted intent feature comprising a goal resulting from a request input from among the plurality of request inputs;
        create a plurality of groups comprising the extracted intent features by:
            slicing the extracted intent features into sliced content; and converting the sliced content into readable content for clustering;

identify, from the plurality of groups, a cluster based on co-occurring extracted intent features corresponding to a same user activity as each other, the co-occurring extracted intent features belonging to a plurality of domains;

generate a proto-scene by ranking the extracted intent features within the cluster; and automatically guide a user through a process using the proto-scene.

9. The computing system of claim 8, wherein the memory includes instructions executable by the at least one processor to create the plurality of groups by:

creating request histories, including a series of the extracted intent features, based on the plurality of request inputs; and slicing the request histories according to slice thresholds.

10. The computing system of claim 9, wherein the slice thresholds are based on at least one of a number of actions, a time duration, a number of device state changes, location information, or intent.

11. The computing system of claim 8, wherein the extracted intent features comprise at least one of a request, a time of the request, or a device state associated with the request.

12. The computing system of claim 8, wherein the memory includes instructions executable by the at least one processor to accomplish the ranking of the extracted intent features by executing a rank aggregation method.

13. The computing system of claim 8, wherein the proto-scene includes a plurality of goals associated with the user activity, and wherein the ranking of the extracted intent features is into a logical order in which the goals would take place.

14. The computing system of claim 13, wherein the memory includes instructions executable by the at least one processor to:

compare the proto-scene to existing scenes in a scene database according to a goal overlap threshold for scene management, wherein scene management comprises adding the proto-scene to the scene database, modifying an existing scene from the scene database to incorporate at least one goal from the proto-scene, or discarding the proto-scene.

15. A non-transitory computer readable medium storing instructions that, when executed by at least one processor of a Natural Language Processing (NLP) computing system, cause the at least one processor to:

extract, from a plurality of request inputs received via an input interface, intent features related to the plurality of request inputs;

create a plurality of groups comprising the extracted intent features by using natural language processing, each extracted intent feature comprising a goal resulting from a request input from among the plurality of request inputs, wherein to create the plurality of groups, the instructions when executed cause the at least one processor to:

slice the extracted intent features into sliced content; and convert the sliced content into readable content for clustering;

identify, from the plurality of groups, a cluster based on co-occurring extracted intent features corresponding to a same user activity as each other, the co-occurring extracted intent features belonging to a plurality of domains;

generate a proto-scene by ranking the extracted intent features within the cluster, wherein the proto-scene includes a plurality of goals associated with the user activity; and automatically guide a user through a process using the proto-scene.

16. The non-transitory computer readable medium of claim 15, wherein the instructions when executed further cause the at least one processor to create the plurality of groups by:

creating request histories, including a series of the extracted intent features, based on the plurality of request inputs;

slicing the request histories according to slice thresholds.

17. The non-transitory computer readable medium of claim 16, wherein the slice thresholds are based on at least one of a number of actions, a time duration, a number of device state changes, location information, or intent.

18. The non-transitory computer readable medium of claim 15, wherein the extracted intent features comprise at least one of a request, a time of the request, or a device state associated with the request.

19. The non-transitory computer readable medium of claim 15, wherein the instructions when executed further cause the at least one processor to accomplish the ranking of the extracted intent features by executing a rank aggregation method.

20. The non-transitory computer readable medium of claim 15, wherein the instructions when executed further to cause the at least one processor to:

compare the proto-scene to existing scenes in a scene database according to a goal overlap threshold for scene management, wherein scene management comprises adding the proto-scene to the scene database, modifying an existing scene from the scene database to incorporate at least one goal from the proto-scene, or discarding the proto-scene.

21. The method of claim 1, wherein converting the sliced content into readable content for clustering comprises creating, for each slice of content in the sliced content, a vector representing that slice of content.

* * * * *